US012726524B1

(12) United States Patent
Jones et al.

(10) Patent No.: US 12,726,524 B1
(45) Date of Patent: Sep. 1, 2026

(54) SYSTEM AND METHOD FOR PROVIDING SECURITY CONFIGURATION IN A DATA CENTER ENVIRONMENT

(71) Applicant: DIGITAL PORPOISE, LLC, Austin, TX (US)

(72) Inventors: Jason T. Jones, Dayton Beach, FL (US); Daniel James Howley, Eagle Mountain, UT (US); Drew Hall, Owasso, OK (US); Travis Ewert, Highlands Ranch, CO (US)

(73) Assignee: DIGITAL PORPOISE, LLC, Austin, TX (US)

( * ) Notice: Subject to any disclaimer, the term of this patent is extended or adjusted under 35 U.S.C. 154(b) by 0 days.

(21) Appl. No.: 19/350,398

(22) Filed: Oct. 6, 2025

(51) Int. Cl.
*H04L 9/40* (2022.01)

(52) U.S. Cl.
CPC .......... *H04L 63/20* (2013.01); *H04L 63/0428* (2013.01)

(58) Field of Classification Search
CPC . H04L 63/04–0492; H04L 63/14–1491; H04L 63/20–205
See application file for complete search history.

(56) References Cited

U.S. PATENT DOCUMENTS

2002/0170052 A1* 11/2002 Radatti ................ G06F 21/564 707/999.01
2008/0040790 A1* 2/2008 Kuo ..................... G06F 21/604 726/22
2009/0187763 A1* 7/2009 Freericks ............. H04L 63/168 713/167
2012/0151208 A1* 6/2012 Park ................ H04N 21/64322 713/160
2017/0302689 A1* 10/2017 Jiang .................... G06F 21/577
2023/0244466 A1* 8/2023 Shah ...................... G06F 9/541 717/178

FOREIGN PATENT DOCUMENTS

CN 109032626 A * 12/2018 ............... G06F 8/61
CN 119051977 A * 3/2025 .......... H04L 41/069
KR 20090096221 A * 9/2009 ............ G06F 15/16

* cited by examiner

*Primary Examiner* — Madhuri R Herzog
(74) *Attorney, Agent, or Firm* — Sterne, Kessler, Goldstein & Fox P.L.L.C.

(57) ABSTRACT

In an embodiment, a method provides an environment for privately exchanging data for AI tasks. Identification of a task to perform, and a characteristic describing data needed to execute the task, is received. A data provider within the environment is located that has access to a data set according to the characteristic. A task provider within the environment is located. The located task provider is configured to execute the task. A real-time, private, and secure network connection between the data provider and the task provider is established. The established connection is configured such that the data provider and the task provider are able to communicate via the network connection without using publicly accessible network addresses. The data set is transferred from the data provider to the task provider via the established network connection. In response to the transfer, the task provider executes the task using the data set.

20 Claims, 13 Drawing Sheets

SYSTEM AND METHOD FOR PROVIDING SECURITY CONFIGURATION IN A DATA CENTER ENVIRONMENT

FIELD

The present disclosure relates to systems and methods for improving computer security in private data center environments by automatically provisioning, updating, and monitoring security tools, and by providing enriched telemetry and visualization for real-time incident awareness.

BACKGROUND

Data centers are facilities that house and operate computing, networking, and storage infrastructure, along with supporting systems such as power, cooling, and connectivity. These environments enable large-scale processing, storage, and transmission of data for workloads including cloud computing, web hosting, online services, e-commerce, artificial intelligence (AI), and machine learning (ML). The growth of AI and ML has significantly increased the volume of data, the diversity of workloads, and the complexity of hardware deployed in modern data centers.

As these environments scale, the attack surface expands. Cybersecurity threats targeting data centers can exploit misconfigurations, unpatched systems, and delayed deployment of security controls. Traditional approaches often require manual configuration and update of security tools, which introduces latency and risk of incomplete coverage. Furthermore, existing monitoring solutions may lack real-time visibility and actionable intelligence, resulting in delayed detection and remediation of security incidents.

Accordingly, there is a need for systems and methods that (i) automate the provisioning and updating of security tools across heterogeneous data center environments, and (ii) provide enriched, real-time monitoring and visualization to enable rapid incident response.

SUMMARY

In an embodiment, a method provides security in a data center environment. In the method, a first computing device in a data center environment receives information of a second computing device in the data center environment. The information comprises at least one of: a hostname, an IP address, a product name, a version name, an operating system, a CPU usage, a memory usage, storage space, a network adapter, and a geographic location. The first computing device configures a security tool based on the received information of the second computing device. The first computing device deploys the security tool at a network location in the data center environment where the network location is accessible by the second computing device. The second computing device retrieves the security tool from the network location and deploys the security tool on the second computing device by making an API call to the security tool. The second computing device reports to the first computing device a status of the deployment of the security tool.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

DESCRIPTION OF DIAGRAMS

The features and advantages of the example embodiments described herein will become apparent to those skilled in the art to which this disclosure relates upon reading the following description, with reference to the accompanying drawings.

In the drawings, like reference numbers generally indicate identical or similar elements. Additionally, generally, the left-most digit(s) of a reference number identifies the drawing in which the reference number first appears.

Figure 1:
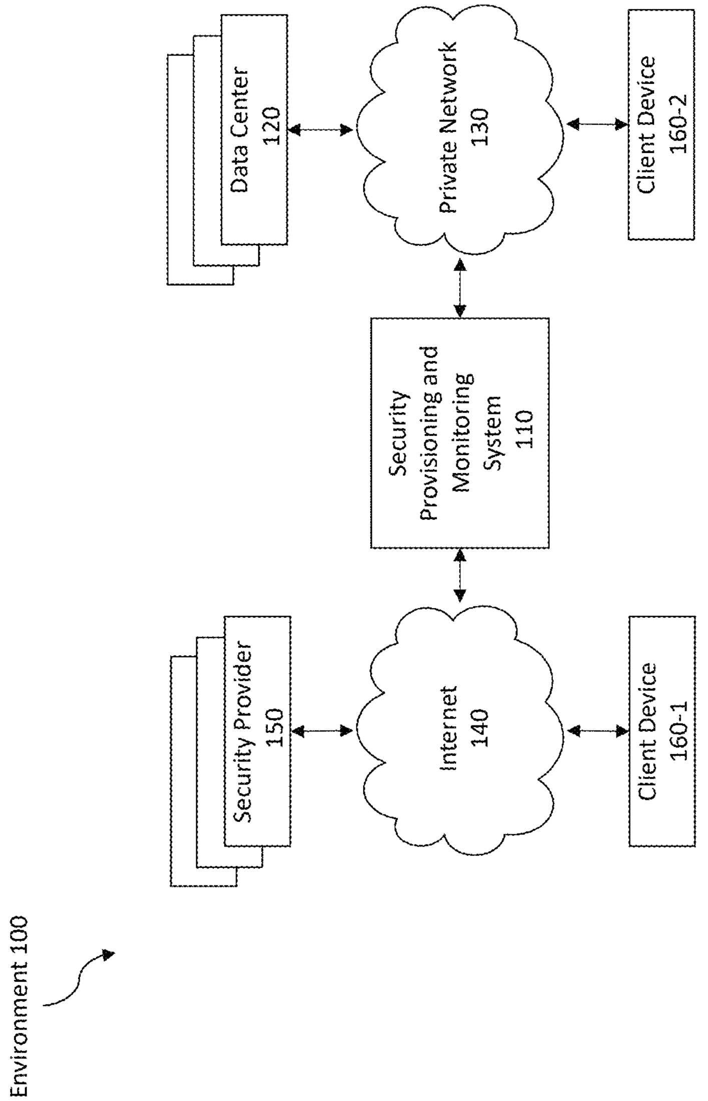
FIG. 1 is a block diagram illustrating various functional components of an environment, according to an embodiment.

Aspects of the present disclosure will be described with reference to the accompanying drawings.

DETAILED DESCRIPTION

Provided herein are system, apparatus, device, method and/or computer program product embodiments, and/or combinations and sub-combinations thereof, for provisioning and monitoring security within a data center environment. The systems and methods described herein may utilize a security provisioning and monitoring system to configure, deploy, monitor, and update a security tool within a data center environment. The security provisioning and monitoring system may further provide an interface allowing devices to view security logs, provision security tools, and respond to security incidents within the data center environment.

Current data center environments require security to protect the systems within the environments. For example, a data center may host intrusion detection systems and firewalls to protect various servers. Given the volume of transactions at modern data centers, there is a need to secure these environments as rapidly as possible to prevent intrusions or leaks.

Configuring these security systems is typically a labor-intensive process where teams of engineers have to identify the specifications of the security environment. Once the specifications are identified, the team has to manually configure security systems to run within the environment. This configuration not only impacts the initial set up, but also the upgrade process because the team has to again manually configure a new version of the security system, introducing additional delay in securing the environment.

Additionally, current systems often face significant delay between the detection and remediation of a security issue. For example, while a security tool within a data center may report a security incident, remediating the issue requires an engineer to access the system, check information related to the reported incident, and take remedial action. For example, the engineer may shut down the entire system or terminate any affected processes. Requiring manual effort by the engineering team introduces significant delay during which time the vulnerability can be exploited by a malicious third-party.

A solution to this problem is to use a security provisioning and monitoring system that automatically configures, deploys, and monitors security tools within a data center environment. As will be discussed below, the security provisioning and monitoring system may identify where a security system is to be deployed. The security provisioning and monitoring system may then configure the tool based on the target environment. For example, security provisioning and monitoring system may configure the tool based on details of a specific server where the tool will be deployed. The security provisioning and monitoring system may deploy the tool and monitor its execution through the use of logs. For example, the tool may publish logs that are collected by the security provisioning and monitoring system. The security provisioning and monitoring system may parse the logs and identify information such as whether a security incident has occurred, or the status of the tool executing in the environment. The security provisioning and monitoring system may host an interface displaying information from the logs, such as the locations of systems that are currently online, as well as detected security events. For example, security provisioning and monitoring system may generate a heatmap depicting the severity of vulnerabilities detected at various data centers throughout the environment.

FIG. 1 is a block diagram illustrating various functional components of an environment, according to an embodiment. Environment 100 includes security provisioning and monitoring system 110, data center 120, private network 130, internet 140, security provider 150, and client device 160.

Data center 120 may be a facility that houses and operates various types of computing, networking, and storage equipment, as well as the power, cooling, security, and connectivity systems that support them. Data center 120 may enable the processing, storage, and transmission of large amounts of data for various purposes, such as cloud computing, web hosting, online services, e-commerce, artificial intelligence, and big data analytics. Data center 120 may store one or more data sets. Data at data center 120 may be public, private, or a combination thereof. For example, one portion of a data set may be publicly accessible, whereas a different part may be private. Data center 120 may include data affiliated with multiple entities. In an example, a first customer associated with client device 160-1 and a second customer associated with client device 160-2 may both store their respective data set at data center 120.

Private network 130 may be a private, secure, real-time network. Private network 130 may connect entities via one or more of a private physical OSI layer 1 connection (e.g., an optical network exchange), a private Ethernet OSI layer 2 connection, a private Internet Protocol address space that is separate from a public internet, or a combination thereof. In some embodiments, private network 130 may be further configured to support new interoperable protocols configured to support data exchange and AI node coordination. AI node coordination may involve tasks including training, transferring weights (e.g., models), backpropagation, etc. Example protocols include, but are not limited to, distributed Ethernet, ultra-Ethernet traffic, InfiniBand, Tesla Transport Protocol over Ethernet traffic, RDMA over Converged Ethernet, bottleneck, bandwidth, and round-trip (BBR) congestion control, sparse wrapper algorithm (SWAG) for ML/AI, among others. BBR congestion control may be used to manage network traffic for training synchronization. SWAG may be used to support deep learning tasks with spare data. Internet 140 may be a public internet.

Security provisioning and monitoring system 110 may be implemented using one or more servers and/or databases. In some embodiments, security provisioning and monitoring system 110 may be implemented as an application in an enterprise computing system and/or a cloud-computing system. In some embodiments, security provisioning and monitoring system 110 may be a computer system such as computer system 1000 described with reference to FIG. 10. Although environment 100 depicts a single instance of security provisioning and monitoring system 110, environment 100 may include any number of security provisioning and monitoring system 110. For example, each data center 120 may include an instance of security provisioning and monitoring system 110.

Security provisioning and monitoring system 110 may be configured to deploy, monitor, and manage a security tool within environment 100. Security provisioning and monitoring system 110 may execute multiple processes (e.g., threads) to execute these tasks. Security provisioning and monitoring system 110 may be configured to deploy and monitor security systems within private network 130. For example, security provisioning and monitoring system 110 may configure and deploy a security tool within data center 120. Security provisioning and monitoring system 110 may be configured to deploy security tools on a specific machine or in certain environments of data center 120. For example, security provisioning and monitoring system 110 may configure and deploy a security tool within a virtual machine executing on a server at data center 120.

As will be discussed below, security provisioning and monitoring system 110 may obtain security tools from security provider 150. Security provisioning and monitoring system 110 may obtain a security tool based on where the tool is going to be deployed. For example, security provisioning and monitoring system 110 may obtain a penetration testing security tool for deployment within a specific data center 120. The security tool may be penetration testing software, antivirus software, encryption software, firewall software, network monitoring software, intrusion detection and prevention software, or any combination thereof. The security tool may, for example, identify an open network port, an available protocol, and an executing process on the system where it is deployed. The security tool may be further configured to scan the system for known vulnerabilities.

Security provisioning and monitoring system 110 may identify where to deploy a security tool based on input from private network 130 or internet 140. For example, a user of client device 160-2 may transmit a message to security provisioning and monitoring system 110 to deploy firewall software and network monitoring software within data center 120. Client device 160-1 and 160-2 may be any internal or external system, including a system inside or outside the data center environment. In different embodiments, they may be cloud systems or on-premise systems. The users may be humans or software (e.g., AI) agents. Security provisioning and monitoring system 110 may be configured to update security tools. For example, security provisioning and monitoring system 110 may communicate with security provider 150 to identify whether new versions for deployed tools are available for use. In some embodiments, security provisioning and monitoring system 110 may receive a message via internet 140 or private network 130 indicating that a new version of a deployed tool is available. In response, security provisioning and monitoring system 110 may configure the new version and deploy it within data center 120.

Security provisioning and monitoring system 110 may track which security tools are deployed within environment 100. Security provisioning and monitoring system 110 may track versions of the security tools that are deployed within environment 100. For example, security provisioning and monitoring system 110 may track that a first version of antivirus software is deployed at a first data center 120, but that a second version of the antivirus software is deployed at a second data center 120. Security provisioning and monitoring system 110 may include a manifest listing which security tools are deployed within environment 100. Security provisioning and monitoring system 110 may use this information to determine which tools to update. As noted above, security provisioning and monitoring system 110 may determine that a new version of a security tool is available. Security provisioning and monitoring system 110 may reference the manifest to determine which instances of the deployed tools should be updated.

Security provisioning and monitoring system 110 may identify information describing the data center environment where a security tool is to be deployed. The information may include, but is not limited to: a hostname, an IP address, a product name, a version name, an operating system, a CPU usage, a memory usage, storage space, a network adapter, and a geographic location. Security provisioning and monitoring system 110 may obtain this information in order to provision the tool properly. For example, security tools may be configured differently based on whether the server where the tool is going to be deployed is a Windows machine or a Linux machine. Accordingly, security provisioning and monitoring system 110 may configure various settings based on whether the machine is Windows or Linux. As will be discussed below, security provisioning and monitoring system 110 may monitor the deployed security tool to track security incidents within the data center environment. Thus, security provisioning and monitoring system 110 may use the IP address of where security tool is to be deployed so that logs or other data can be retrieved from the tool.

Security provisioning and monitoring system 110 may configure the security tool based on the information. For example, security provisioning and monitoring system 110 may access an API of the tool and input the operating system of the machine that tool will be deployed to, such as a server at data center 120. Similarly, security provisioning and monitoring system 110 may provide an IP address of a location within the data center environment where logs or other data from the tool should be published. In some embodiments, security provisioning and monitoring system 110 may configure the security tool to allow connections on a given port. For example, security provisioning and monitoring system 110 may configure the security tool to allow connections on port 80 or 443 for HTTP and HTTPS connections, respectively. The connection may be used to communicate logs or other data generated by the security tool.

Security provisioning and monitoring system 110 may deploy the tool. In some embodiments, security provisioning and monitoring system 110 may directly interface with the machine to deploy the tool. For example, security provisioning and monitoring system 110 may transmit a zip file including the security tool to the machine via a network connection, such as via private network 130 or internet 140. In some embodiments, security provisioning and monitoring system 110 may transmit the configured tool at a network location in the data center environment (e.g., on private network 130), such that the machine may retrieve the configured tool from the network location. For example, the security provisioning and monitoring system 110 may transmit the configured tool to a repository on the network location at private network 130 or internet 140. Security provisioning and monitoring system 110 may transmit a message to the machine including the address of the repository on the network. The machine may retrieve the configured tool from the repository.

The machine may retrieve and deploy the tool. The machine may be a server at data center 120. The server may make an API call to the tool to cause it to be deployed. The server may report a status of the deployment to security provisioning and monitoring system 110. For example, the server may report that the tool successfully deployed. Similarly, the server may report that the tool failed to deploy and include one or more errors associated with the failed deployment.

Once deployed, security provisioning and monitoring system 110 may monitor the deployed security tool to track security incidents within the data center environment (e.g., at data center 120). As noted above, security provisioning and monitoring system 110 may configure the tool to publish data such as logs, to a network location within the data center environment. Security provisioning and monitoring system 110 retrieve the published logs to determine status of the tool and the machine where it is deployed. For example, security provisioning and monitoring system 110 may retrieve the logs and publish the logs to a queue associated with the machine where the tool is deployed. Security provisioning and monitoring system 110 may, in some embodiments, enrich the logs prior to publishing them to the queue. Enriching the logs is beneficial to add information that the tool, or the machine where the tool is deployed does not possess. Security provisioning and monitoring system 110 execute a dedicate process to retrieve, enrich, and publish the logs.

For example, the tool may be executing within a sandbox at a server at data center 120. Since the tool is operating in a sandbox, it may not have access to data of the server where it's deployed, such as the server's hostname, IP address, or geolocation. Thus, logs generated by the tool within the sandbox may be enriched by adding details of the server (e.g., the server hostname, server IP address, server geolocation). Similarly, security provisioning and monitoring system 110 may retrieve data from a third-party to augment a security incident listed in the log. For example, the log may indicate that a certain vulnerability has been detected. To provide additional awareness, security provisioning and monitoring system 110 may contact a third party and retrieve information on the vulnerability such as whether the vulnerability has been exploited, and whether a patch exists for the vulnerability. Security provisioning and monitoring system 110 may add this third party information to the log for downstream analysis. Security provisioning and monitoring system 110 may also enrich the log by adding identifying information. For example, security provisioning and monitoring system 110 may calculate a hash of the log based on its contents and assign the hash an identifier of the log.

Security provisioning and monitoring system 110 may retrieve logs from the queue, extract information included within the log and use it to update a graphical user interface. In some embodiments, security provisioning and monitoring system 110 may execute a dedicate process to retrieving the logs from the queue. The GUI may be hosted at the same machine as security provisioning and monitoring system 110. In some embodiments, the interface may be hosted at a machine separate from security provisioning and monitoring system 110. The GUI may be used to visualize security incident information in the logs. For example, the GUI may depict locations of each data center 120 where the security tools are deployed. The GUI may also depict the occurrence of security incidents based on security incident information in the logs. For example, the GUI may display a heatmap indicating a severity of a vulnerability listed in the log.

The GUI may be configured to support user interaction. For example, a user of client device 160 may access the GUI and be able to pan and zoom the displayed map to view information of data center 120 at different level of granularity. The interface may allow a user to click on a displayed data center 120 and generate a detailed view. The detailed view may list a status of data center 120, such as whether it is active or inactive. The detailed view may also show detected vulnerabilities that have been extracted from the logs from data center 120. The interface may allow the user to attempt to mitigate listed vulnerabilities. For example, security provisioning and monitoring system 110 may have contacted a third-party and determine that a patch exists for a vulnerability listed in the log. Here, the interface may allow the user to click on the listed vulnerability and download the patch. Similarly, the interface may allow the user to shut down or restrict processes executing at data center 120 based on detected vulnerabilities. For example, if a vulnerability is detected at a server at data center 120, the interface may display the detected vulnerability and an option to shut the server down to reduce possible impact of the vulnerability.

Noted above, security provisioning and monitoring system 110 may interact with security provider 150. Security provider 150 may be any entity connected to internet 140. Security provider 150 may communicate with security provisioning and monitoring system 110 via internet 140. Environment 100 may include any number of security providers 150. Security provider 150 may be an entity that creates security tools. Security provisioning and monitoring system 110 may obtain security tools from security provider 150 for provisioning within private network 130 (e.g., at data center 120). In some embodiments, security provider 150 may be an entity that stores information related to security vulnerabilities. For example, security provider may store common vulnerability scores (CVS) for one or more vulnerabilities. Security provider 150 may be further configured to track whether a vulnerability has been exploited, and/or whether a patch exists for the vulnerability.

Client device 160 may be a computer system such as computer system 1000 described with reference to FIG. 10. Client device 160 may be a client system such as a desktop workstation, laptop or notebook computer, netbook, tablet, smart phone, and/or other computing device that may be using an enterprise computing system.

Client device 160 may be connected to private network 130 and/or internet 140. For example, client device 160-2 may be connected to private network 130, whereas client device 160-1 may be connected to internet 140. Here, client device 160-1 may be unable to directly access devices on private network 130. However, security provisioning and monitoring system 110 may interface with client device 160-1 to provide client device 160-1 indirect access to private network 130. For example, security provisioning and monitoring system 110 may transmit status of a server at data center 120 to client device 160-1.

Client device 160 may interface with security provisioning and monitoring system 110 to view the status of security at data center 120. For example, security provisioning and monitoring system may host an interface displaying security information from data center 120. Client device 160 may access the interface at security provisioning and monitoring system 110 to view the displayed security information. In some embodiments, security provisioning and monitoring system 110 may transmit alerts to client device 160 based on monitored security at data center 120. For example, if security provisioning and monitoring system 110 detects a security incident at data center 120, security provisioning and monitoring system 110 may transmit a notification to client device 160 including the security incident information. In some embodiments, client device 160 may take actions based on the information reported by security provisioning and monitoring system 110. For example, client device 160 may transmit a command to data center 120 to shut down one or more processes or servers. Client device 160 may transmit the command directly to data center 120, or through security provisioning and monitoring system 110.

Figure 2:
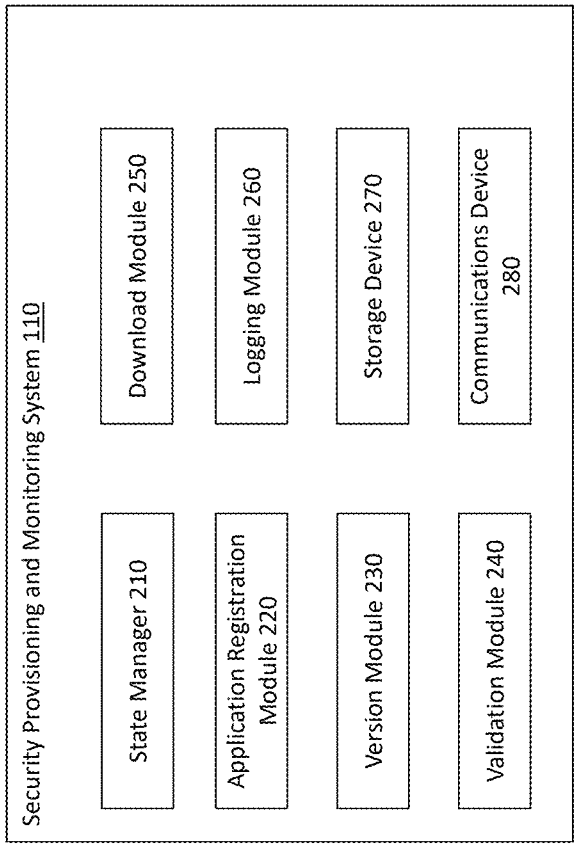
FIG. 2 is a block diagram of a security provisioning and monitoring system, according to an embodiment.

FIG. 2 is a block diagram of security provisioning and monitoring system 110, according to an embodiment. Security provisioning and monitoring system 110 includes state manager 210, application registration module 220, version module 230, validation module 240, download module 250, logging module 260, storage device 270, and communication device 280.

State manager 210 may be configured to monitor status of a component of data center 120. For example, state manager 210 may monitor the status of a security tool executing within a server at data center 120. As will be discussed below, security provisioning and monitoring system 110 may receive logs from data center 120. State manager 210 may obtain status information from the received logs. State manager 210 may take various actions based on information within the logs as well as communications received from client device 160. For instance, state manager 210 may detect a vulnerability listed in the log. Based on the vulnerability, state manager 210 may take actions to mitigate the vulnerability. For example, state manager 210 may transmit a message to the environment at data center 120, where the log was generated, to shut down one or more applications or components impacted by the vulnerability. For example, the log may indicate that one or more ports of a server at data center 120 are open, and thus vulnerable to probing by a malicious third-party. State manager 210 may transmit a message to the server at data center 120 indicating that the ports should be closed.

Application registration module 220 may be configured to track which applications are deployed at which data center 120. For example, application registration module 220 may maintain a manifest listing each data center 120, the components therein (e.g., servers) and which applications (e.g., security tools) are executing on the components. Application registration module 220 may be further configured to retrieve applications (e.g., security tools) for deployment within environment 100. For example, application registration module 220 may retrieve applications from security provider 150. Application registration module 220 may configure the retrieved applications for deployment within data center 120. Application registration module 220 may deploy the configured application within environment 100. For example, application registration module 220 may deploy the configured application at a location on private network 130. Application registration module 220 may package the application as a zip file or other file for deployment. Data center 120 may retrieve the configured application from the location on private network 130.

Version module 230 may track the versions of applications executing within environment 100. Version module 230 may communicate version information to application registration module 220 for updating the manifest of executing applications. In some embodiments, version module 230 may track versions of applications based on calculating a hash of the application or part of the application. Application registration module 220 may add the hash to the configured application prior to deploying it. Version module 230 may perform the comparison by comparing the hash values of the different instances. In this way, a new version of the application may be pushed to the respective clients if version module 230 detects that the versions are different based on the different hash values.

Validation module 240 may be configured to validate retrieved applications (e.g., security tools). For example, validation module 240 may execute configure and execute the retrieved application within a local environment on security provisioning and monitoring system 110, prior to deploying the application at data center 120. For example, validation module 240 may generate an isolated container including the retrieved application and execute the application within the isolated container.

Download module 250 may be configured to retrieve new applications (e.g., security tools), or new versions of applications. For example, download module 250 may communicate with security provider 150 to obtain a new application.

Logging module 260 may be configured to receive output of a security tool executing at data center 120. The output may be in the form of a log. Logging module 260 may publish the log to a queue for processing. In some embodiments, logging module 260 may enrich the log by adding data to it. For example, logging module 260 may augment vulnerability information listed the log with a vulnerability score, or whether the vulnerability has previously been exploited.

Storage device 270 may be a memory device configured to store data at security provisioning and monitoring system 110. For example, storage device 270 may be configured to store logs processed by logging module 260. Communication device 280 may comprise any suitable network interface capable of transmitting and receiving data, such as, for example a modem, an Ethernet card, a communications port, or the like. Communications device 280 may be able to transmit data using any wireless transmission standard such as, for example, Wi-Fi, Bluetooth, cellular, or any other suitable wireless transmission.

Figure 3:
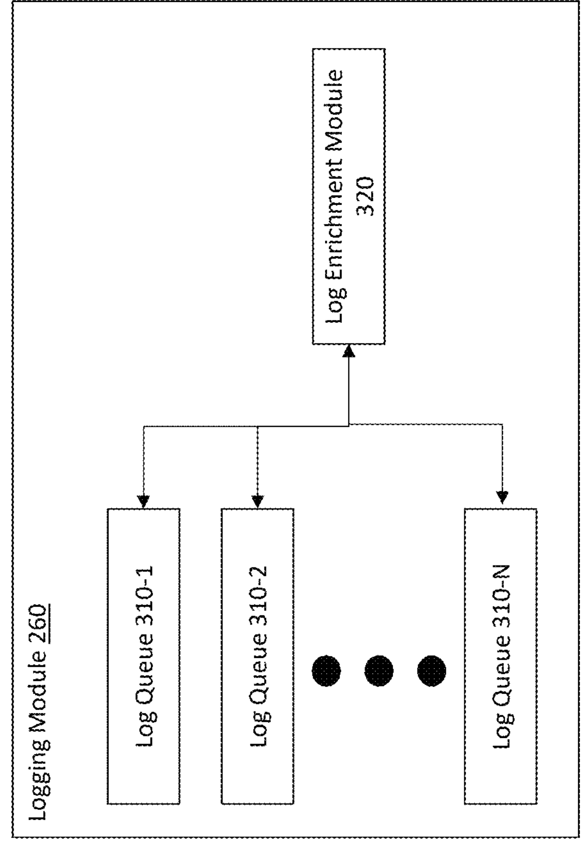
FIG. 3 is a block diagram of a logging module, according to an embodiment.

FIG. 3 is a block diagram of logging module 260, according to an embodiment. Logging module 260 includes log queue 310 and log enrichment module 320. As depicted logging module 260 includes any number of log queue 310 (e.g., log queue 310-1-log queue 310-N).

Log queue 310 may be a data structure configured to store logs generated by a security tool of data center 120 and retrieved by logging module 260. Logging module 260 may inspect a log and determine which instance of log queue 310 to place the log on. For example, logging module 260 may place the log on a log queue 310-1 corresponding to the environment (e.g., docket container) of data center 120 where the log was generated. Similarly, logging module 260 may place the log on a log queue 310-1 corresponding to the server of data center 120 where the log was generated, based on a hostname of the server included in the log.

Logging module 260 may be configured to dynamically create and destroy instances of log queue 310. Logging module 260 may create an instance of log queue 310 for each security tool in each data center 120. For example, if data center 120 includes 100 security tools, logging module 260 may generate 100 instances of log queue 310, one for each security tool. In some embodiments, state manager 210 may command logging module 260 to create and destroy instances of log queue 310 based on communications from data center 120. In some embodiments, logging module 260 may dynamically create and destroy instances of log queue 310 based on the contents of a log. As will be discussed below, logging module 260 may inspect a log to determine which log queue 310 to place it on. If no instance of log queue 310 exists that corresponds to data in the log, such as the environment at data center 120 where the log was generated, logging module 260 may create an instance of log queue 310 corresponding to the environment.

Log enrichment module 320 may be configured to add data to logs. In some embodiments, log enrichment module 320 may add data to a log prior to the log being placed on log queue 310. In some embodiments, log enrichment module 320 may dequeue a log from log queue 310, enrich the log, and place the log back on log queue 310. Enrichment is beneficial to add data that may be unavailable in the environment where the log was generated. For example, if a log was generated within an isolated sandbox on a server at data center 120, the sandbox may have no knowledge of the server's IP address. Log enrichment module 320 may enrich the log by adding the server IP address so that downstream analysis can more accurately identify the exact environment that generated the log.

Log enrichment module 320 may reference a policy to determine what information to add to the log. The policy may be unique to the environment where the security tool is executing. For example, the policy may be unique to a server at data center 120, or a sandbox within a server at data center 120. The policy may define what data to add to the log. For example, the policy may include but is not limited to: a hostname, an IP address, a product name, a version name, an operating system, a CPU usage, a memory usage, storage space, a network adapter, and a geographic location. Log enrichment module 320 may add information in the policy to the log.

Figure 4:
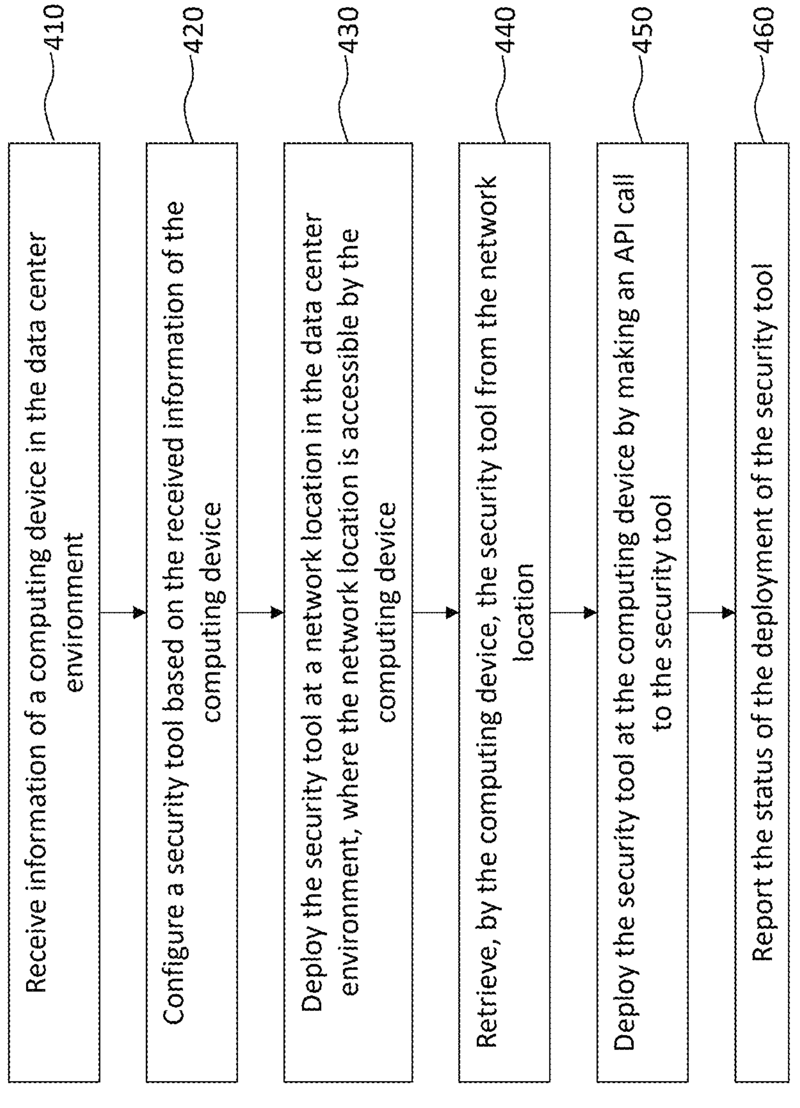
FIG. 4 is a flowchart illustrating a method for provisioning security to assets in a data center environment or in a cloud, according to an embodiment.

FIG. 4 is a flowchart illustrating a method 400 for provisioning security within a data center environment, according to an embodiment. Method 400 shall be described with reference to FIG. 1, however, method 400 shall not be limited to that example embodiment. As mentioned above, client device 160-1 and 160-2 may be any internal or external system, including a system inside or outside the data center environment. In different embodiments, they may be cloud systems or on premise systems. The users may be humans or software (e.g., AI) agents.

The foregoing description will describe an embodiment of the execution of method 400 with respect to security provisioning and monitoring system 110. While method 400 is described with reference to security provisioning and monitoring system 110, method 400 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4.

At step 410, security provisioning and monitoring system 110 receives information of a computing device in the data center environment. Security provisioning and monitoring system 110 may receive the information from client device 160. The data center environment may be data center 120. For example, client device 160 may send a message to security provisioning and monitoring system 110 indicating the hostname of a server at data center 120. The information may further include a message to deploy a security tool at the computing device. In particular, client device 160 will have been installed with an Enterprise golden image. It could message system 110 with information (hostname, IP, installed tool w/version). It would be the responsibility of Version Module 230 to recognize the need for a tool/upgrade.

At step 420, security provisioning and monitoring system 110 configures a security tool based on the received information of the computing device. Security provisioning and monitoring system 110 may configure the security tool such that it is configured to execute on the computing device. For example, if the computing device is a Linux server, security provisioning and monitoring system 110 may configure the tool to execute within a Linux environment. Similarly, if the computing device is a Windows server, security provisioning and monitoring system 110 may configure the tool to execute within a Windows environment. Security provisioning and monitoring system 110 may also configure the security tool to communicate with entities on private network 130. For example, security provisioning and monitoring system 110 may configure the security tool including the location of where to publish logs on private network 130.

At step 430, security provisioning and monitoring system 110 stores the metadata that the system needs to provision the tool at a network location (source code repository). Based on this information, application registration module 220 connects to the computing device and installs the necessary tool based off of the collected metadata, deploying the security tool. The data center environment may be data center 120. The network location may be accessible by the computing device. The network location may be a source code repository. Security provisioning and monitoring system 110 may package the security tool prior to deploying it. For example, security provisioning and monitoring system 110 may create a compressed file (e.g., a zip file) including the security tool. Security provisioning and monitoring system 110 may transmit the compressed file to a server at data center 120.

At step 440, the computing device receives the security tool from the network location. The security tool may be pushed to the computing device from the network location. Alternatively, the security tool may be pulled by the computing device from the network location. For example, the computing device may download the security tool from the network location on private network 130.

At step 450, the computing device deploys the security tool by making an API call to the security tool. In some embodiments, security provisioning and monitoring system 110 may provide the API call to the computing device for deploying the security tool.

At step 460, the computing device reports the status of the deployment of the security tool. For example, the computing device may report to security provisioning and monitoring system 110 whether the security tool deployed successfully or not. In some embodiments, the computing device may report the status directly to security provisioning and monitoring system 110. In some embodiments, the computing device may report the deployment status through logs. For example, the logs generated by the security tool at the computing device may indicate whether the tool is operating properly or not.

Figure 5:
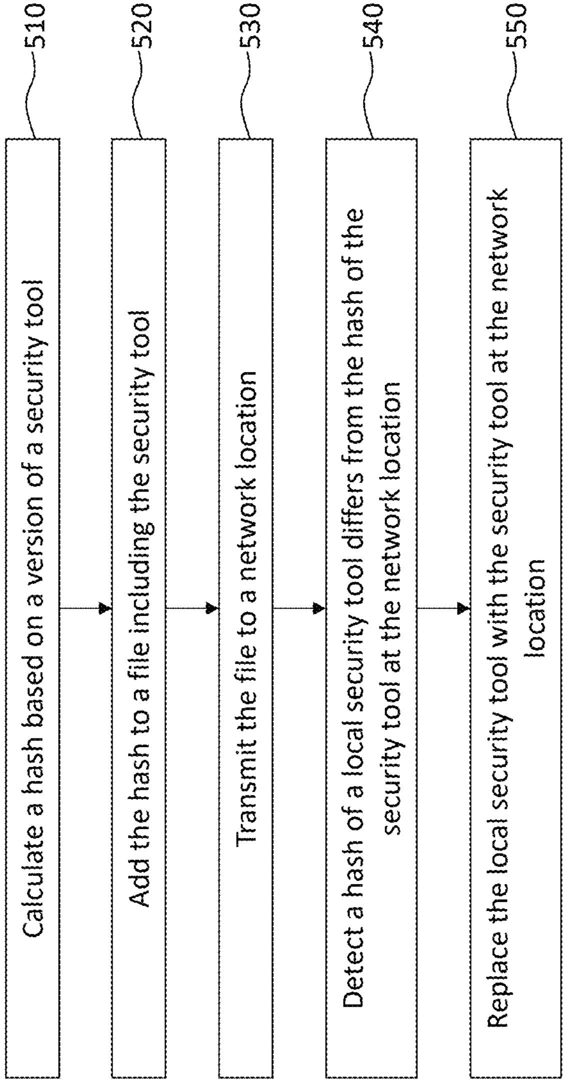
FIG. 5 is a flowchart illustrating a method for deploying and updating security tool, according to an embodiment.

FIG. 5 is a flowchart illustrating a method 500 for deploying and updating security tool, according to an embodiment. Method 500 shall be described with reference to FIG. 1, however, method 500 shall not be limited to that example embodiment. method 500 may be implemented by modules in system 110 illustrated in FIG. 2.

The foregoing description will describe an embodiment of the execution of method 500 with respect to security provisioning and monitoring system 110. While method 500 is described with reference to security provisioning and monitoring system 110, method 500 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5.

At step 510, security provisioning and monitoring system 110 calculate a hash based on a version of a security tool. Security provisioning and monitoring system 110 may use any hash algorithm to calculate the hash. The hash may be based on the version string of the security tool. In some embodiments, the hash may be based on the executable file of the security tool and the version string.

At step 520, security provisioning and monitoring system 110 adds the hash to a file including the security tool. For example, security provisioning and monitoring system 110 may construct a zip file including the security tool executable and a text field including the hash. In some embodiments, security provisioning and monitoring system 110 may add the hash to the file name of the security tool.

At step 530, security provisioning and monitoring system 110 transmits the file to a network location. Security provisioning and monitoring system 110 may transmit the file to a location at private network 130. In some embodiments, security provisioning and monitoring system 110 may transmit an indication to data center 120 indicating that the file is present at the network location.

At step 540, the computing device detects a hash of a local security tool differs from the hash of the security tool at the network location. The computing device may be at data center 120. The computing device may compare the hash value of its local security tool to the hash value of the security tool at the network location. Since the hash value is based on the version, a difference in the hash values is indicative of a difference in the version of the local security tool compared to the version of the security tool at the network location.

At step 550, the computing device replaces the local security tool with the security tool at the network location. The computing device may perform the replacement based on the different hash values. Noted above, since the hash values may correspond to the version of the security tool, the computing device may determine that a newer version of the tool is available and replace its local version with the updated version at the network location. The computing device may download the security tool at the network location and deploy it.

Figure 6:
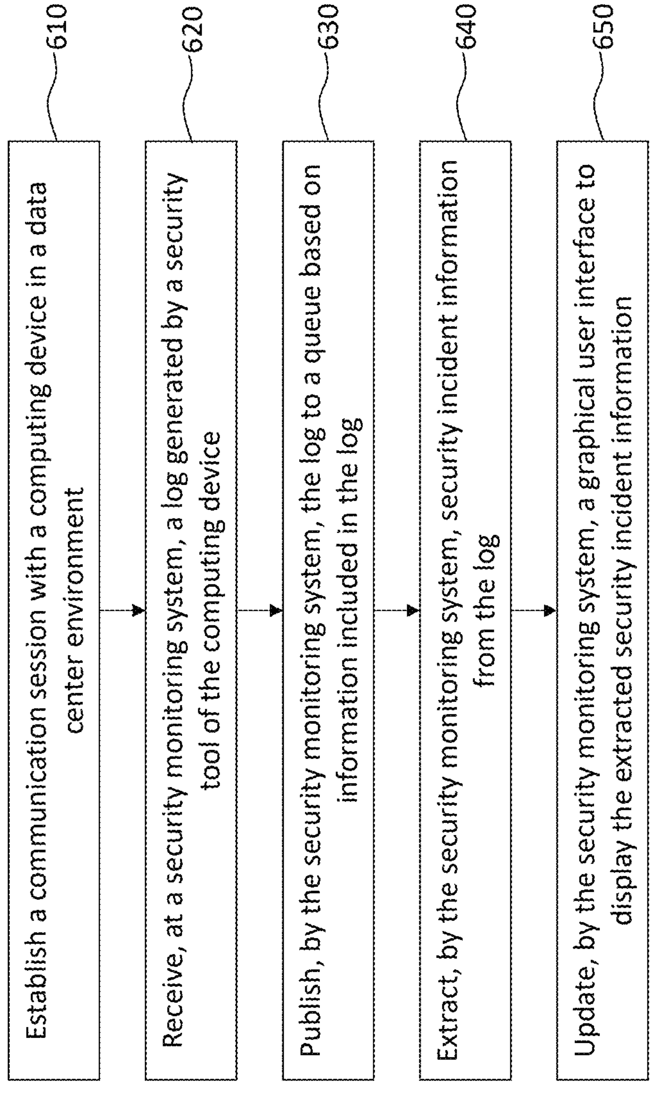
FIG. 6 is a flowchart illustrating a method for monitoring security within a data center environment, according to an embodiment.

FIG. 6 is a flowchart illustrating a method 600 for monitoring security within a data center environment, according to an embodiment. Method 600 shall be described with reference to FIG. 1, however, method 600 shall not be limited to that example embodiment.

The foregoing description will describe an embodiment of the execution of method 600 with respect to security provisioning and monitoring system 110. While method 600 is described with reference to security provisioning and monitoring system 110, method 600 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 6.

At step 610, security provisioning and monitoring system 110 establishes a communication session with a computing device in a data center environment. The data center environment may be data center 120. The communication session may be over private network 130. The communication session may be an HTTPS session.

At step 620, security provisioning and monitoring system 110 receives a log generated by a security tool of the computing device. The log may indicate a status of the security tool, such as whether the tool is successfully executing or has encountered an error. In some embodiments, the log may include security incident information, such as whether a vulnerability has been detected by the security tool. In some embodiments, the log may include information about the operation of the computing device. For example, the log may include metrics of the computing device such as memory usage, CPU usage, disk usage, and network usage. The log may further include a list of processes executing on the computing device. The log may further include information about the environment where the tool is executing such as a container name and a local date/time.

At step 630, security provisioning and monitoring system 110 publishes the log to a queue based on information included in the log. For example, security provisioning and monitoring system 110 may publish the log to a queue associated with the environment where the security tool is executing. For example, if the log was generated within a container at a server at data center 120, security provisioning and monitoring system 110 may publish the log to a queue that is associated with the container. The queue may be log queue 310. In some embodiment, security provisioning and monitoring system 110 may create a new log queue if it does not have a queue corresponding to information included within the log. For example, the log may be the first log generated by a security tool. Based on determining that there is not a queue corresponding to the security tool, security provisioning and monitoring system 110 may create a new queue for the security tool and add the log to the new queue.

At step 640, security provisioning and monitoring system 110 extracts security incident information from the log. Security provisioning and monitoring system 110 may extract the security incident information after removing the log from the queue. Security provisioning and monitoring system 110 may parse the log and extract certain fields. Security provisioning and monitoring system 110 may parse the log for certain keywords such as "vulnerability" or "incident." Security provisioning and monitoring system 110 may extract one or more words near the detected keywords.

At step 650, security provisioning and monitoring system 110 updates a graphical user interface to display the extracted security incident information. For example, security provisioning and monitoring system 110 may update the GUI to display the location of the environment where the log was generated. Security provisioning and monitoring system 110 may update the GUI to display a severity of the security incident information extracted from the log. For example, security provisioning and monitoring system 110 may generate a visual warning based on a vulnerability listed in the log.

Figure 7:
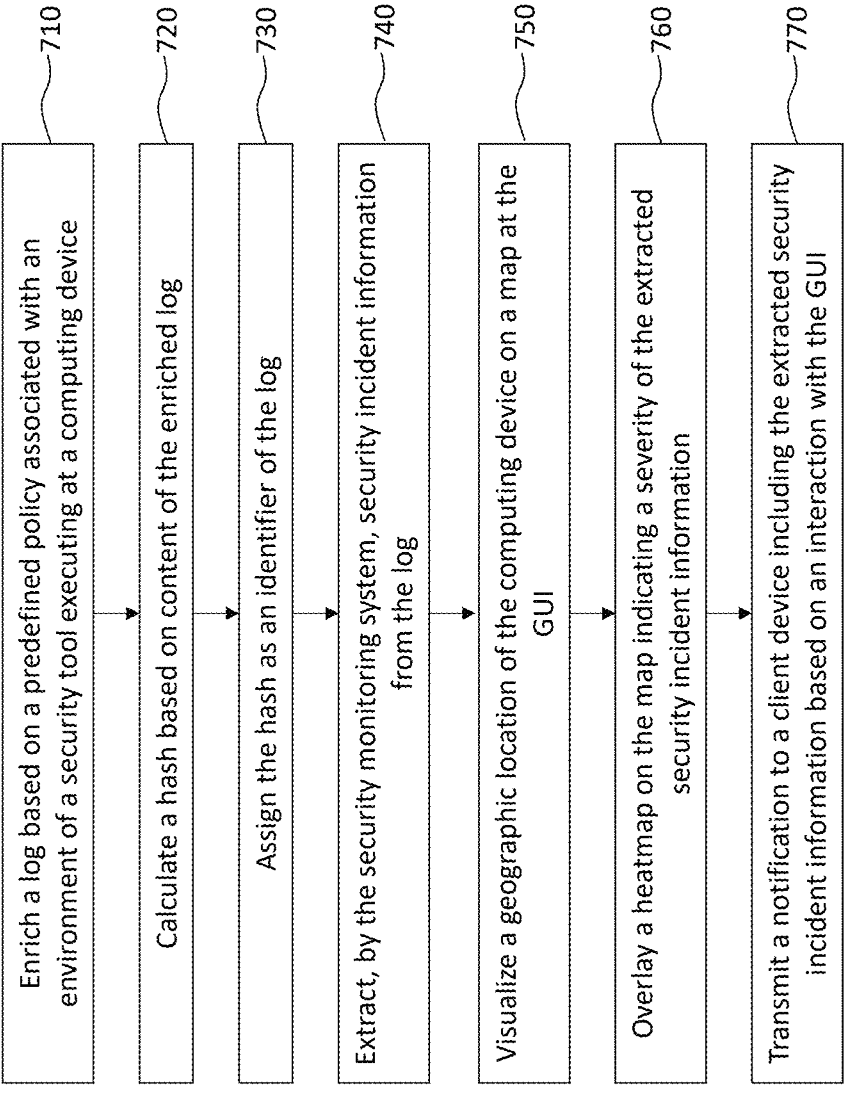
FIG. 7 is a flowchart illustrating a method for visualizing security within a data center environment, according to an embodiment.

FIG. 7 is a flowchart illustrating a method 700 for visualizing security within a data center environment, according to an embodiment. Method 700 shall be described with reference to FIG. 1, however, method 700 shall not be limited to that example embodiment.

The foregoing description will describe an embodiment of the execution of method 700 with respect to security provisioning and monitoring system 110. While method 700 is described with reference to security provisioning and monitoring system 110, method 700 may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 7.

At step 710, security provisioning and monitoring system 110 enriches a log based on a predefined policy associated with an environment of a security tool executing at a computing device. The computing device may be at data center 120. In some embodiments, security provisioning and monitoring system 110 may enrich the log prior to placing the log in the queue. The predefined policy may be associated with the computing device where the security tool is executing. For example, if the security tool is executing on a server at data center 120, the predefined policy may include information about the server such as its geographic location, IP address, organization, computing resources, etc. security provisioning and monitoring system 110 may add the information include in the predefined policy to the log.

In some embodiments, security provisioning and monitoring system 110 may enrich the log after communicating with a third-party such as security provider 150. Security provider 150 may include information on vulnerabilities such as common vulnerability scoring system (CVSS) scores. Security provider 150 may further include whether a vulnerability has been exploited and/or whether a patch exists for the vulnerability. Thus, where the log lists a vulnerability, security provisioning and monitoring system 110 may communicate with security provider 150 to obtain information on the vulnerability such as the CVVS score, whether the vulnerability has been exploited, and whether a patch exists. Security provisioning and monitoring system 110 may add this information to the log.

At step 720, security provisioning and monitoring system 110 calculates a hash based on content of the enriched log. The hash may be a cryptographic hash function such as MD5 or SHA-2. In some embodiments, security provisioning and monitoring system 110 may seed the hash function with a random number. Security provisioning and monitoring system 110 may input the content of the log to the hash function.

At step 730, security provisioning and monitoring system 110 assigns the hash as an identifier of the log. Since the hash may be unique to the log, the hash is useful for identifying the log from amongst a plurality of logs.

At step 740, security provisioning and monitoring system 110 extracts security incident information from the log. As noted above, security provisioning and monitoring system 110 may parse the log to extract security incident information such as whether a vulnerability was detected by the security tool and listed in the log.

At step 750, security provisioning and monitoring system 110 visualizes a geographic location of the computing device on a map at the GUI. The geographic location may be included within the security incident information of the log.

At step 760, security provisioning and monitoring system 110 overlays a heatmap on the map indicating a severity of the extracted security incident information. For example, security provisioning and monitoring system 110 may display a first color for a detected vulnerability that is low risk, and display a second color for a detected vulnerability that is high risk.

At step 770, security provisioning and monitoring system 110 transmits a notification to a client device including the extracted security incident information based on an interaction with the GUI. The client device may be client device 160. For example, a first client device 160-1 may interact with the GUI and, for example, click on the heatmap at the GUI. Security provisioning and monitoring system 110 may display an option to send a notification including the information in the log to users associated the device where the log was generated. For example, client device 160-2 may be associated with an administrator of the machine (e.g., server) where the security tool is executing. Based on the interaction, client device 160-2 may receive a notification including the detected security incident information. This is beneficial to notify the administrator of the potential security incident at the server. The administrator could kick off a notification/incident to a downstream ticket system. Additionally or alternatively, the ticketing may be conducted automatically. In particular, enriched data may be used to ascertain which internal team owns it and then ship it to a ticket queue for that particular internal team. The administrator or the team for security incident processing may have a particular client device 160-2 that they can use to receive and process the notification and/or ticket.

To conduct ticketing automatically, AI processing may be used. For example, a large language model (LLM) may be used to enrich the ticket. The LLM may use a data store of security vulnerability information to enrich the ticket. The store may be inherent to an ELK stack that allows for centralized logging, search, and data visualization. Updates to the ticket will kick back the data store, allowing the LLM to have the most recent vulnerability information to enrich the tickets.

Client device 160 may respond to the notification. For example, the notification may include various actions based on the vulnerability such as an option to terminate processes impacted by the vulnerability, or an option to shut down the machine where the vulnerability is detected. Client device 160 may provide a response (e.g., a shutdown command) to the notification. Security provisioning and monitoring system 110 may receive the response and act accordingly. For example, if the response includes a shutdown command, security provisioning and monitoring system 110 may transmit a shutdown command to the machine at data center 120 where the log was generated, thus mitigating further security risks. Similarly, client device 160 may provide a response including a command to restrict execution of one or more processes based on the vulnerability listed in the log. For example, client device 160 may respond with a command to terminate a process affected by the vulnerability. Security provisioning and monitoring system 110 may receive the response and transmit a command to terminate the process to the machine at data center 120.

Figure 8A:
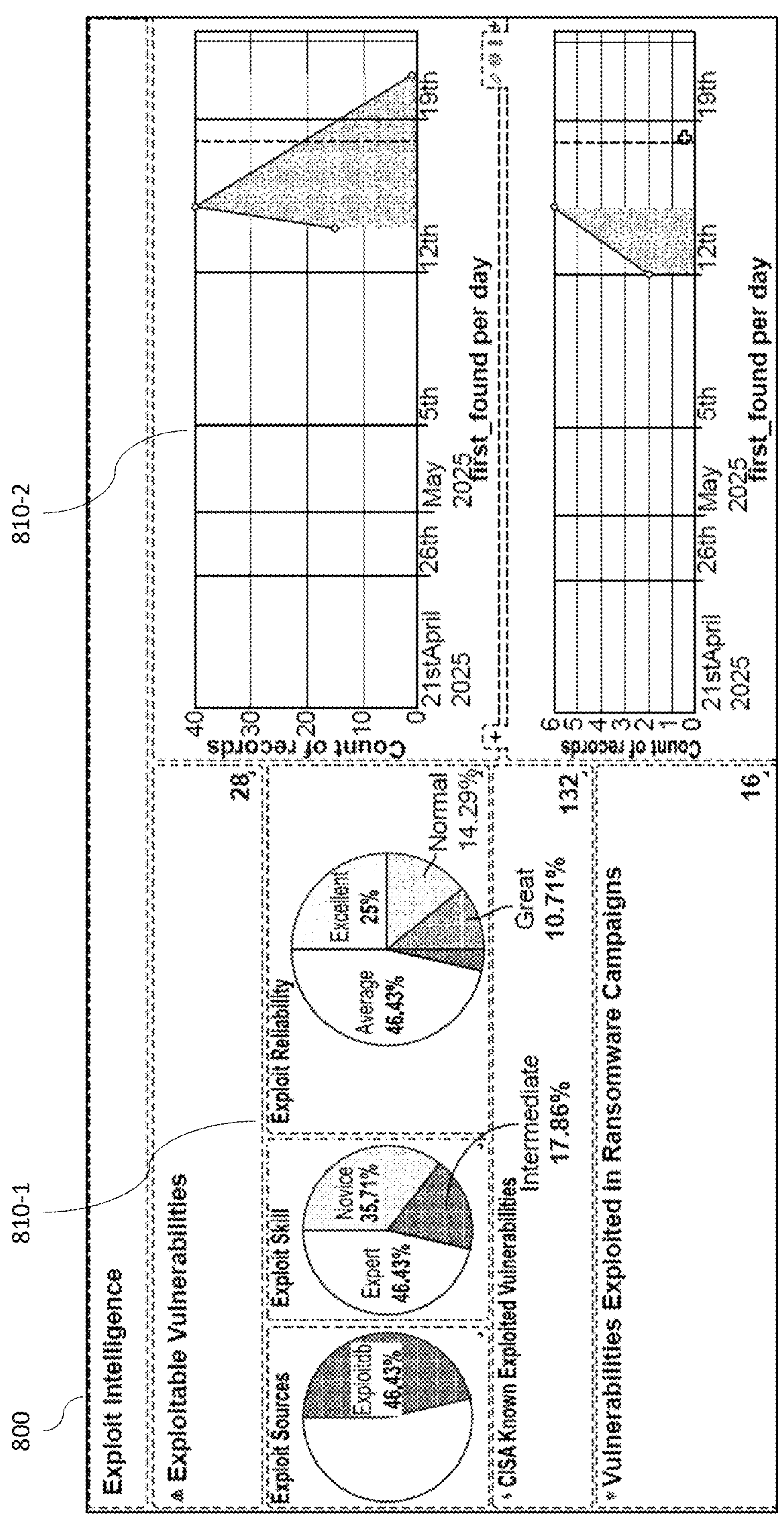
FIGS. 8A-8B are exemplary interfaces for a data center security system, according to embodiments.

FIG. 8A depicts an exemplary interface 800 for using security provisioning and monitoring system 110, according to some embodiments. Security provisioning and monitoring system 110 may host interface 800. Interface 800 may be accessible via private network 130 and/or internet 140. For example, client device 160-2 may access interface 800 via private network 130 whereas client device 160-1 may access interface 800 via internet 140. Interface 800 includes elements 810. Although interface 800 is depicted including two instances of element 810, interface 800 may include any number of instances of element 810.

Interface 800 may be configured to visualize information from logs generated by the security tool. As noted above, security provisioning and monitoring system 110 may retrieve a log and publish the log to a queue based on information within the log. Security provisioning and monitoring system 110 may subsequently retrieve logs from the queue, extract information, and use the extracted information to update interface 800. For example, a log may include security incident information and security provisioning and monitoring system 110 may extract the security incident information and use it to update interface 800. For example, security provisioning and monitoring system 110 may update interface 800 to display element 810-1. Element 810-1 may depict, for example, plots showing vulnerability sources, skill required to exploit the vulnerability, and the reliability of exploits for detected vulnerabilities. Element 810-2, may depict, for example, a graph depict the number of logs generated over a predefined time period. Element 810 of interface 800 may be interactive. For example, a user may be able to click on element 810 to view more details or drill-down to view the data at a more granular level. For example, if the user clicks on the graph in element 810-2, the graph in element 810-2 may be displayed in full-screen.

Figure 8B:
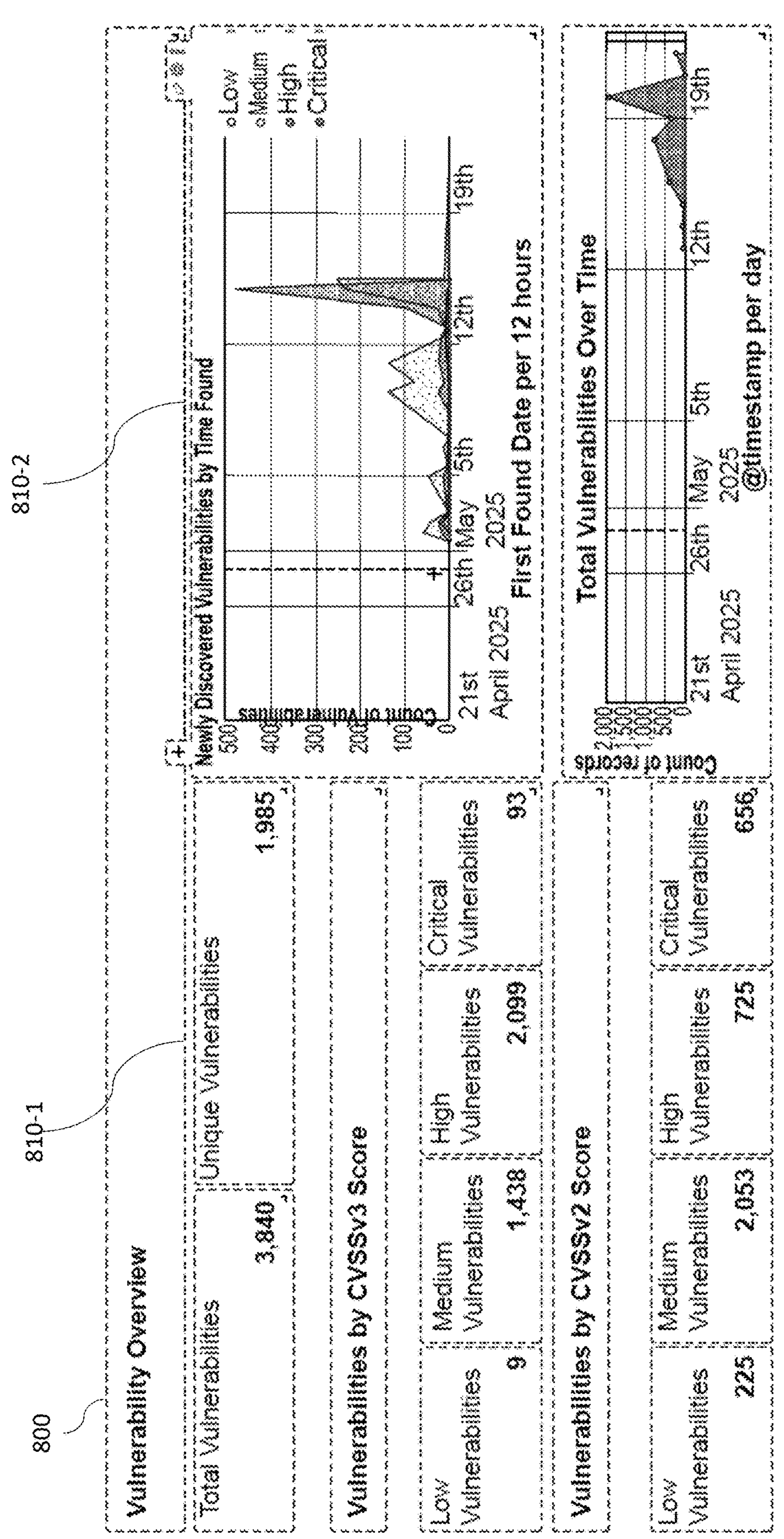

FIG. 8B depicts an exemplary interface 800 for using security provisioning and monitoring system 110, according to some embodiments. Security provisioning and monitoring system 110 may host interface 800. Interface 800 may be accessible via private network 130 and/or internet 140. For example, client device 160-2 may access interface 800 via private network 130 whereas client device 160-1 may access interface 800 via internet 140. Interface 800 includes elements 810.

Interface 800 may depict various pieces of information within elements 810. For example, element 810-1 may depict the number of unique vulnerabilities detected, whereas another element 810 may depict the total number of detected vulnerabilities. Element 810 may also depict severity of vulnerabilities detected by score type, such as CVSSv2 or CVSSv3 scores. Element 810 may also depict graphical elements, such as element 810-2 depicting the number of new vulnerabilities discovered over time.

Figure 9A:
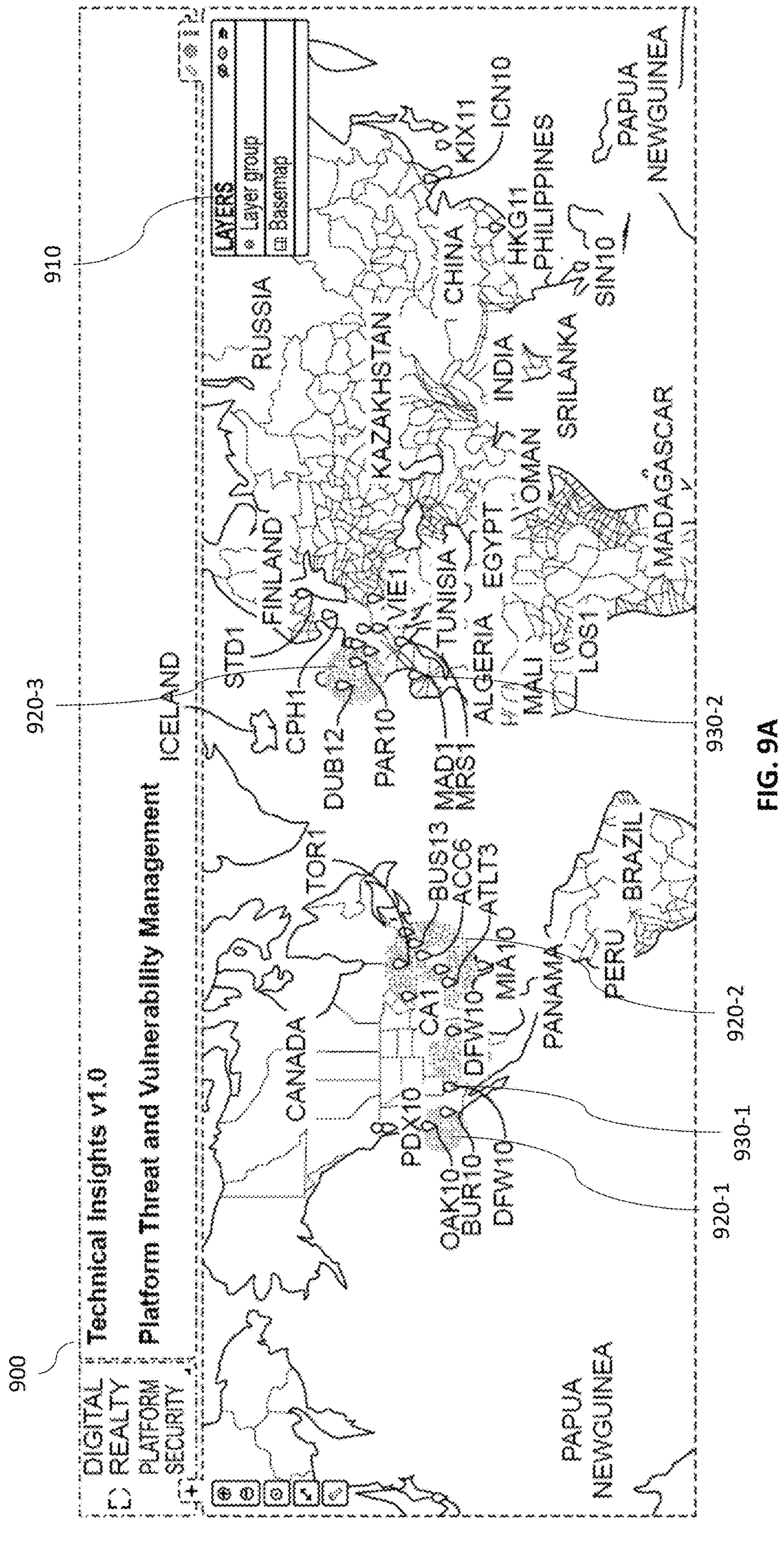
FIGS. 9A-9C are exemplary interfaces for a data center security system, according to embodiments.

FIG. 9A depicts an exemplary interface 900 for using security provisioning and monitoring system 110, according to some embodiments. Security provisioning and monitoring system 110 may host interface 900. Interface 900 may be accessible via private network 130 and/or internet 140. For example, client device 160-2 may access interface 900 via private network 130 whereas client device 160-1 may access interface 900 via internet 140. Interface 900 may depict a map and includes layers 910, heatmap 920, and element 930. Interface 900 may be interactive. For example, the user may be able to click and move the map depicted at interface 900, or use a mouse wheel to zoom in and out.

Layers 910 may be used to depict and control the available layers to display at interface 900. In some embodiments, layers 910 may be stored locally at security provisioning and monitoring system 110, or security provisioning and monitoring system 110 may retrieve selected layers from a source on private network 130 and/or internet 140. Heatmap 920 may be configured to depict the magnitude of a variable. For example, heatmap 920 may indicate the severity of detected vulnerabilities at various instances of data center 120 within the map at interface 900. Security provisioning and monitoring system 110 may extract the detected vulnerability and severity from a log generated by the security tool. For example, heatmap 920-1 may depict severity of vulnerabilities detected at a region on the western coast of the United States, whereas heatmap 920-2 may depict severity of vulnerabilities detected at a region on the eastern coast of the United States. Element 930 may be used to depict the geographic location of data center 120 on the map of interface 900. Security provisioning and monitoring system 110 may obtain the geographic location of data center 120 based on the log generated by the security tool, or security provisioning and monitoring system 110 may look up the geographic location and add it to the log prior to publishing the log to the queue.

Figure 9B:
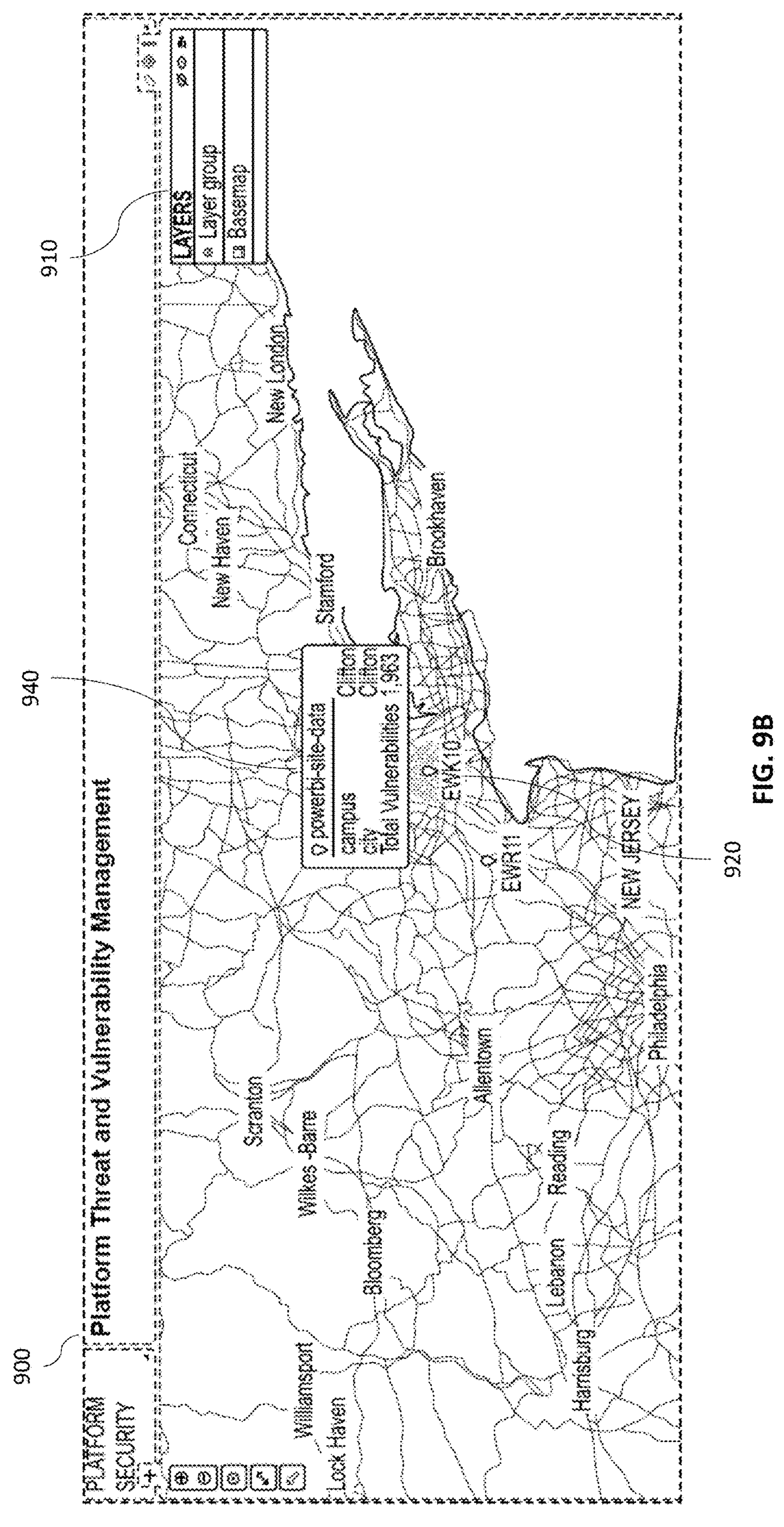

FIG. 9B depicts an exemplary interface 900 for using security provisioning and monitoring system 110, according to some embodiments. Security provisioning and monitoring system 110 may host interface 900. Interface 900 may be accessible via private network 130 and/or internet 140. For example, client device 160-2 may access interface 900 via private network 130 whereas client device 160-1 may access interface 900 via internet 140. Interface 900 includes layers 910, heatmap 920, and pop-up 940. Layers 910 and 920 may be the same as those discussed with respect to FIG. 9A. Pop-up 940 may be displayed on interface 900 when a user interacts (e.g., clicks) element 930. Pop-up 940 may depict information of data center 120 corresponding to element 930. Pop-up 940 may display, for example, the name, location (e.g., city and state), and number of vulnerabilities at data center 120.

Figure 9C:
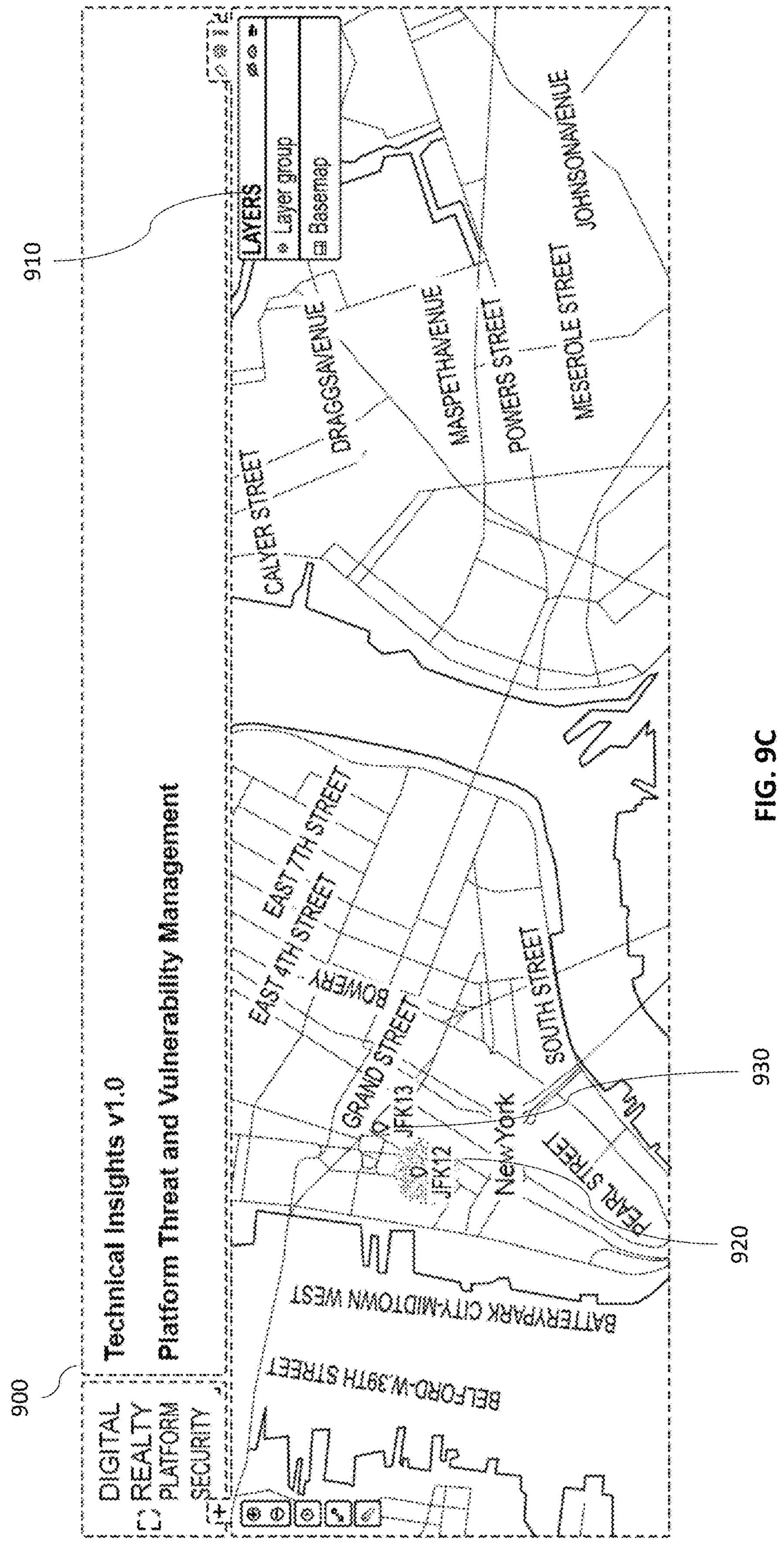

FIG. 9C depicts an exemplary interface 900 for using security provisioning and monitoring system 110, according to some embodiments. Security provisioning and monitoring system 110 may host interface 900. Interface 900 may be accessible via private network 130 and/or internet 140. For example, client device 160-2 may access interface 900 via private network 130 whereas client device 160-1 may access interface 900 via internet 140. Interface 900 includes layers 910, heatmap 920, and element 930. Interface 900 may display a map zoomed in at a particular location (e.g., New York City). Layers 910, heatmap 920, and element 930 may be the same as those described with respect to FIGS. 9A and 9B.

Figure 10:
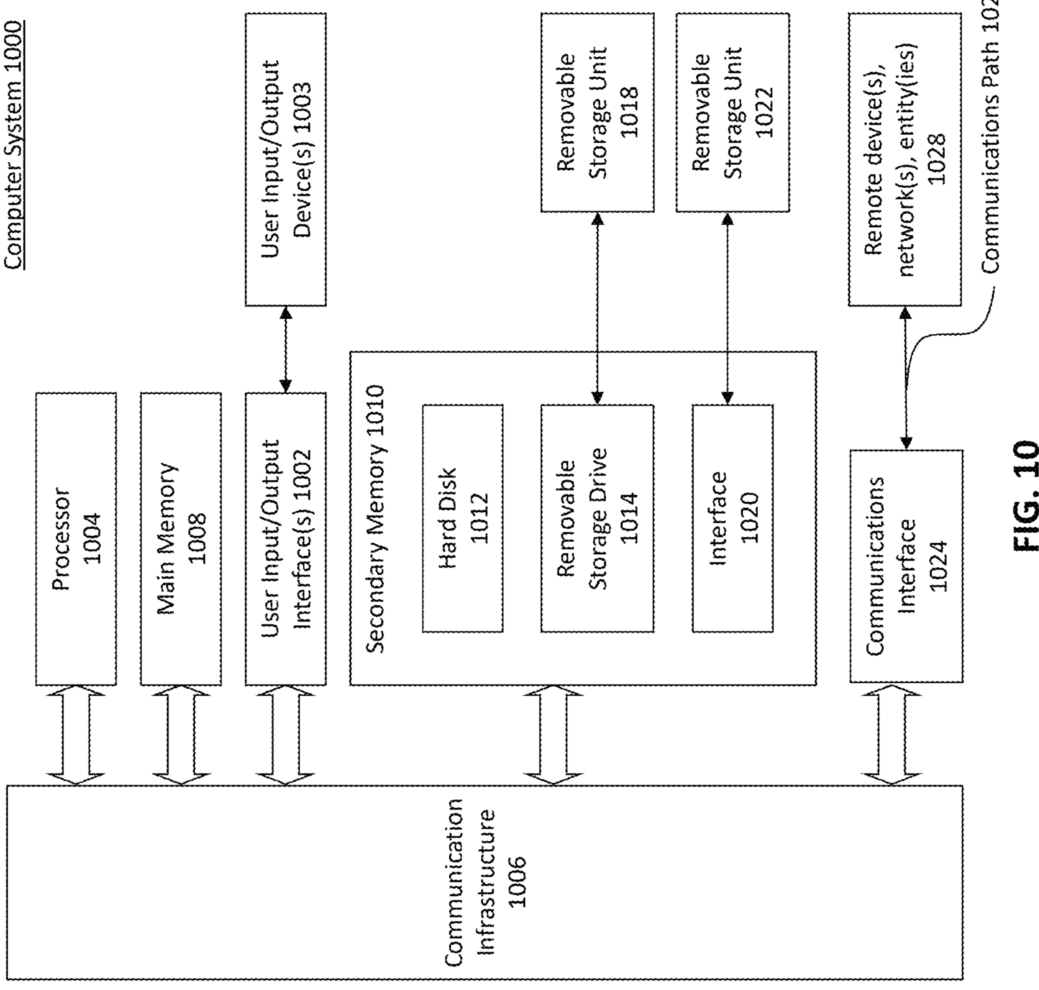
FIG. 10 depicts an example computer system useful for implementing various embodiments.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention (s) are defined solely by the appended claims including any amendments made during the pendency of this application and all equivalents of those claims as issued.

Identifiers, such as "(a)," "(b)," "(i)," "(ii)," etc., are sometimes used for different elements or steps. These identifiers are used for clarity and do not necessarily designate an order for the elements or steps.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, or contains a list of elements, does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural forms can be used, but it does not limit the scope of the disclosure and the same teaching can apply to multiple objects, even if in the current application an object is referred to in its singular form.

The embodiments detailed herein are provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment in at least some instances. Thus, the following claims are hereby incorporated into the Detailed Description, with each claim standing on its own as separately claimed subject matter.

What is claimed is:

1. A method for providing security in a data center environment, the method comprising:

receiving, by a first computing device in the data center environment, information describing an operational context of a second computing device in the data center environment;

configuring, by the first computing device, a security tool based on the received information of the second computing device, wherein the security tool is a software executable, and the configuring sets one or more parameters of the software executable to facilitate compatible execution of the software executable in the operational context of the second computing device;

deploying, by the first computing device, the security tool at a network location in the data center environment wherein the network location is accessible by the second computing device;

receiving, by the second computing device, the security tool at the network location;

deploying, by the second computing device, the security tool on the second computing device by making an API call to the security tool; and reporting, by the second computing device to the first computing device, status of the deployment of the security tool.

2. The method of claim 1, wherein prior to configuring the security tool, the method further comprises retrieving, by the first computing device, the security tool from a third-party system outside of the data center environment.

3. The method of claim 1, wherein deploying the security tool at the network location comprises:

calculating, by the first computing device, a hash based on a version of the security tool;

adding, by the first computing device, the hash to a file including the security tool; and transmitting, by the first computing device, the file to the network location.

4. The method of claim 3, further comprising:

detecting, by the second computing device, a hash of the security tool on the second computing device differs from the hash of the security tool at the network location; and in response to the detection, replacing, by the second computing device, the security tool on the second computing device with the security tool at the network location.

5. The method of claim 1, wherein the status indicates that the security tool deployed successfully on the second computing device.

6. The method of claim 1, wherein the status indicates a stage of the deployment of the security tool failed.

7. The method of claim 6, further comprising, transmitting, by the first computing device to the second computing device, a command restricting execution of one or more processes based on failure to deploy the security tool.

8. The method of claim 1, wherein the information comprises at least one of: a hostname, an IP address, a product name, a version name, an operating system, a CPU usage, a memory usage, storage space, a network adapter, and a geographic location.

9. A system for providing security in a data center environment, comprising:

a first computing device comprising:

a memory; and at least one processor coupled to the memory and configured to:

receive information describing an operational context of a second computing device in the data center environment;

configure a security tool based on the received information of the second computing device, wherein the security tool is a software executable, and the configuring sets one or more parameters of the software executable to facilitate compatible execution of the software executable in the operational context of the second computing device; and deploy the security tool at a network location in the data center environment wherein the network location is accessible by the second computing device; and the second computing device comprising:

a memory; and at least one processor coupled to the memory and configured to:

retrieve the security tool from the network location;

deploy the security tool on the second computing device by making an API call to the security tool; and report, to the first computing device, status of the deployment of the security tool.

10. The system of claim 9, wherein prior to configuring the security tool, the first computing device is further configured to retrieve the security tool from a third-party system outside of the data center environment.

11. The system of claim 9, wherein deploying the security tool at the network location comprises:

calculating, by the first computing device, a hash based on a version of the security tool;

adding, by the first computing device, the hash to a file including the security tool; and transmitting, by the first computing device, the file to the network location.

12. The system of claim 9, wherein the second computing device is further configured to:

detect a hash of the security tool on the second computing device differs from the hash of the security tool at the network location; and in response to the detection, replace the security tool on the second computing device with the security tool at the network location.

13. The system of claim 9, wherein the status indicates that the security tool deployed successfully on the second computing device.

14. The system of claim 9, wherein the status indicates a stage of the deployment of the security tool failed.

15. The system of claim 14, the first computing device is further configured to transmit, to the second computing device, a command restricting execution of one or more processes based on failure to deploy the security tool.

16. The system of claim 9, wherein the information comprises at least one of: a hostname, an IP address, a product name, a version name, an operating system, a CPU usage, a memory usage, storage space, a network adapter, and a geographic location.

17. A non-transitory computer-readable device having instructions stored thereon that, when executed by at least one computing device, cause the at least one computing device to perform operations comprising:

receiving, by a first computing device in the data center environment, information describing an operational context of a second computing device in the data center environment, wherein the information comprises at least one of: a hostname, an IP address, a product name, a version name, an operating system, a CPU usage, a memory usage, storage space, a network adapter, and a geographic location;

configuring, by the first computing device, a security tool based on the received information of the second computing device, wherein the security tool is a software executable, and the configuring sets one or more parameters of the software executable to facilitate compatible execution of the software executable in the operational context of the second computing device;

deploying, by the first computing device, the security tool at a network location in the data center environment wherein the network location is accessible by the second computing device;

retrieving, by the second computing device, the security tool from the network location;

deploying, by the second computing device, the security tool on the second computing device by making an API call to the security tool; and reporting, by the second computing device to the first computing device, status of the deployment of the security tool, wherein the status indicates at least one of: the security tool deployed successfully on the second computing device or a stage of the deployment of the security tool failed.

18. The non-transitory computer-readable device of claim 17, wherein prior to configuring the security tool, the operations further comprise retrieving, by the first computing device, the security tool from a third-party system outside of the data center environment.

19. The non-transitory computer-readable device of claim 17, wherein deploying the security tool at the network location comprises:

calculating, by the first computing device, a hash based on a version of the security tool;

adding, by the first computing device, the hash to a file including the security tool; and transmitting, by the first computing device, the file to the network location.

20. The non-transitory computer-readable device of claim 17, the operations further comprising:

detecting, by the second computing device, a hash of the security tool on the second computing device differs from the hash of the security tool at the network location; and in response to the detection, replacing, by the second computing device, the security tool on the second computing device with the security tool at the network location.

* * * * *